United States Patent [19]
Finlayson et al.

[11] 3,959,608
[45] May 25, 1976

[54] REEL ARRANGEMENT FOR ELECTRIC WIRING

[75] Inventors: Thomas J. Finlayson, Palos Hills, Ill.; Michael H. Grace, Griffith, Ind.; George H. Smith, Hazelcrest, Ill.

[73] Assignee: Allis-Chalmers Corporation, Milwaukee, Wis.

[22] Filed: Dec. 10, 1974

[21] Appl. No.: 531,291

[52] U.S. Cl. .................. 191/12.2 R; 214/DIG. 11; 187/9 R; 191/12 R
[51] Int. Cl.² ........................................ H02G 11/00
[58] Field of Search ............ 191/12 R, 12.2 R, 12.4; 137/355.16, 355.2, 355.23; 242/107, 107.1, 107.13, 107.2, 107.6, 115, 116; 214/700, 701 P, 701 R, DIG. 11; 187/9 R, 9 E

[56] References Cited
UNITED STATES PATENTS

| | | | |
|---|---|---|---|
| 3,443,698 | 5/1969 | Lopez | 191/12 R |
| 3,646,282 | 2/1972 | Herring | 191/12 R |
| 3,773,987 | 11/1973 | Davis | 191/12.4 |
| 3,882,288 | 5/1975 | Rasmussen | 191/12 R |

*Primary Examiner*—Robert B. Reeves
*Assistant Examiner*—D. W. Keen
*Attorney, Agent, or Firm*—Charles L. Schwab

[57] ABSTRACT

The operator's station of a lift truck is optionally elevatable with the carriage and the electric control interconnection between the operator's station, and the truck main frame includes a novel reel mechanism for the multiple lead electric conduit which does not use slip rings. The reel mechanism includes two drums which rotate together on a stationary shaft secured to the main frame. One drum is for coiling a flexible multi-lead round conduit which has its free end connected to the electric control console at the operator's station. The other drum contains a multiple lead flexible ribbon having its outer end connected to the inner end of the round conduit. The ribbon is coiled about the stationary shaft with its radially inner end passing through a hollowed portion of the stationary shaft and thence to a point of connection to a terminal block on the main frame. As the operator's station is raised with the carriage the round conduit is reeled out from the primary drum thereby rotating it against the bias of a windup spring. As the round conduit is reeled out from the primary drum the secondary drum is coiling the loosely wound ribbon about the shaft thus increasing the number of turns of its coil. The use of ribbon type electric conduit in the loosely wound secondary drum obviates the binding and jamming incurred when round conduit is used.

7 Claims, 6 Drawing Figures

REEL ARRANGEMENT FOR ELECTRIC WIRING

BACKGROUND OF THE INVENTION

This invention relates to reeling an electric control conduit without using slip rings. Heretofore others have proposed to use a pair of drums to reel conduits without use of a swivel connection wherein as the conduit is reeled out from the primary drum the conduit on the secondary drum is either wound from a loosely wound condition to a tight condition or unwound from a tight condition to a loosely wound condition. Such and similar mechanisms are shown in U.S. Pat. Nos. 1,276,825; 1,446,410; 1,868,409; 2,438,515; 2,518,071; 3,144,218; and 3,146,967.

BRIEF DESCRIPTION OF THE INVENTION

This invention provides an improved electric conduit reel mechanism of the type that does not use slip rings. While the use of round multiple lead conduit for the portion reeled off the primary drum is operationally satisfactory, the use of round multiple lead conduit on the secondary drum is not satisfactory because it wedges and jams requiring excessive torque to rotate the drums, excessive stretching of the leads and wear and tear of the conduit. In the present invention, this problem is obviated by using a flexible multiple lead ribbon which has been found to coil and uncoil without wedging and jamming. The end of the reel mounting shaft is hollowed and axially slotted to permit the radially inner end of the coiled ribbon to pass from the shaft without special connectors or wiring harness.

BRIEF DESCRIPTION OF THE DRAWINGS

The invention is incorporated in a lift truck as illustrated by the drawings, in which.

DETAILED DESCRIPTION OF THE PREFERRED EMBODIMENT

Figure 1:
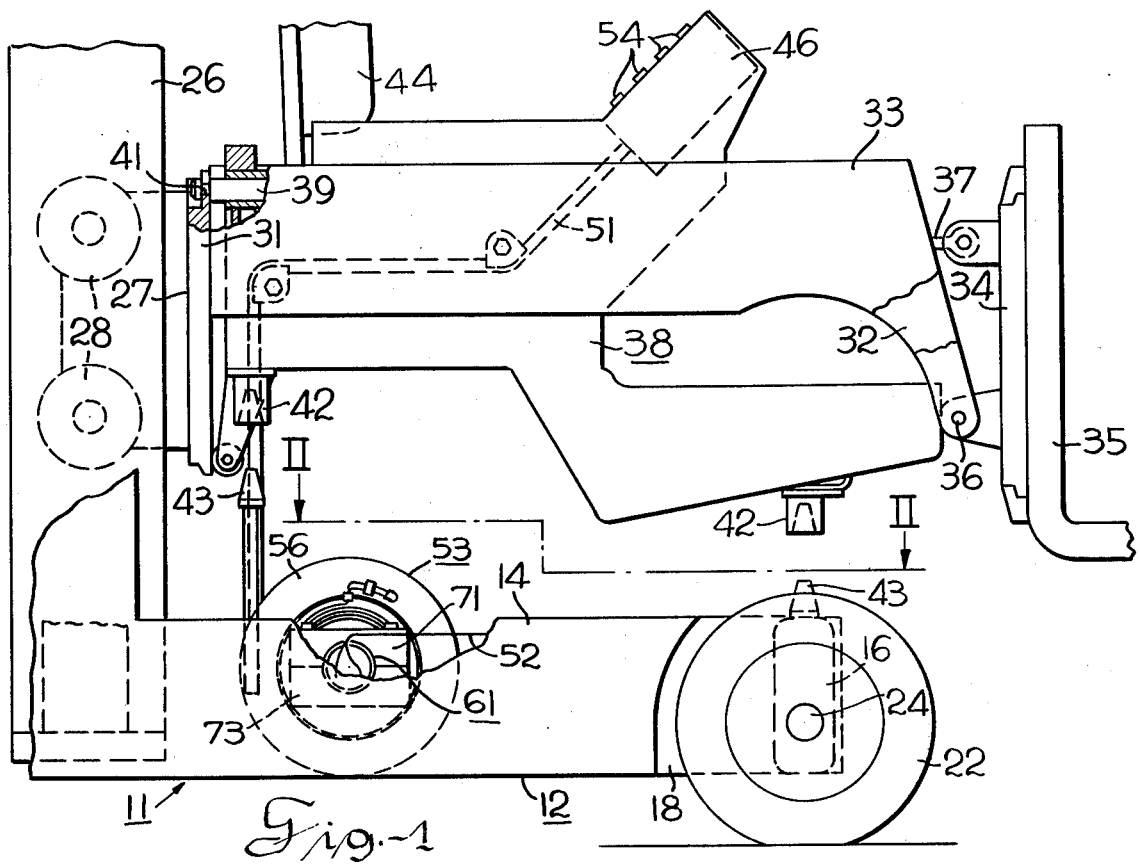
FIG. 1 is a partial side view of a lift truck.
Figure 2:
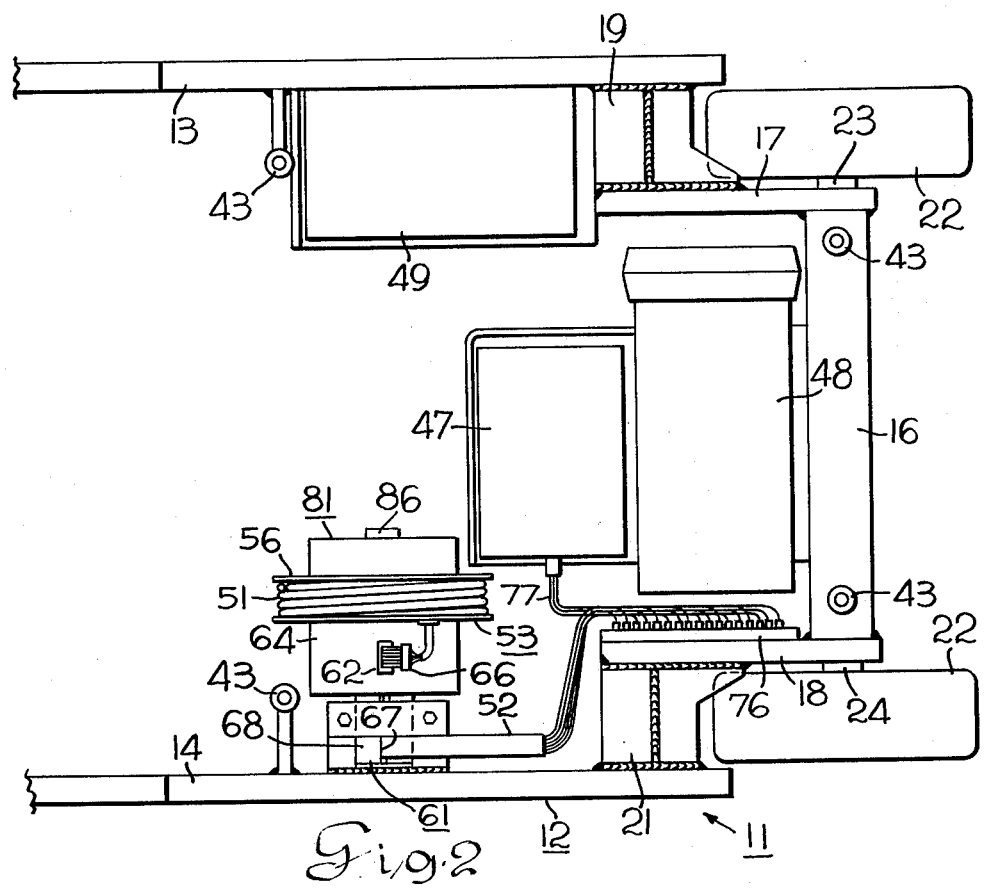
FIG. 2 is a view taken along the line II—II in FIG. 1.

Referring to FIGS. 1 and 2, the lift truck 11 of the illustrated, preferred embodiment of the invention is similar to that shown in co-pending U.S. patent application of Donald A. Ahrendt and Thomas J. Finlayson, Ser. No. 501,072, Operator's Station Optionally Stationary or Elevated, filed Aug. 27, 1974. The main frame 12 of the lift truck includes low, forwardly extending legs 13, 14 which are rigidly secured to a cross beam 16 by parallel plates 17, 18 welded to the cross beam and short transverse braces 19, 21. A pair of nonsteerable support wheels 22 are mounted on the front end of the frame 12 by stub axles 23, 24. A vertical mast 26 is rigidly secured to the frame 12 by means, not shown, and supports a carriage 27 by means of upright channels of the mast engaging carriage support rollers 28. The carriage 27 includes a transverse vertical plate 31 and a pair of forwardly extending arms 32, 33 to which a fork support plate 34 is pivotally connected by a pair of pins 36, only one of which is shown. The transverse plate 34 supports forks 35 and is tiltable about the transverse axis of aligned pins 36 by a pair of hydraulic jacks 37, only one of which is shown.

An operator's station 38 is optionally elevated with the carriage as occurs in FIG. 1 when latching pins 39 are extended rearwardly to engage vertical slots 41 in the plate 27, or is stationary on the main frame, in which condition support members 42 on the operator's station engage support members 43 on the main frame 12. The operator's station is provided with an operator's seat 44 and an electric control console 46 by which the operator controls operation of the lift truck in both the elevated and stationary condition of the operator's station.

In order to maintain a control relationship between the operator's station 38 and the electric control apparatus 47, 48, 49 on the main frame of the truck, flexible multiple lead conduits 51, 52 are provided together with a reel mechanism 53. One end of the round conduit 51 is connected to the control console 46 and the leads therein are connected to electric control apparatus within the console such as switches, not shown, operated by push buttons 54. The round conduit 51 is wound about a primary drum 56 of the reel mechanism 53 with its radially inner end 57 extending through a transverse opening 58 in an annular flange 59 of the primary drum 56. This twisted part of the ribbon 52 serves to mechanically connect the latter to the shaft 61.

As shown in FIGS. 3–6, the flat ribbon or conduit 52 is loosely coiled about a tubular part 68 of a stationary reel support shaft 61 and has its radially outer end 62 extending through an axially extending slot 63 in a secondary drum 64 which is secured to the primary drum by cap screws 65. The leads of ribbon 52 are connected to the ends of corresponding leads of the round conduit 51 by a suitable connector 66. The ribbon 52 is coiled in the same direction as conduit 51 and at the radially inner diameter of the coil it extends through an axial slot 67 in a tubular part 68 of the shaft 61. The ribbon 52 upon entering slot 67 is twisted 90 degrees and then passes axially away from the drum 64, by way of the interior cavity 69 of the tubular part 68 of the shaft 61, is twisted back 90 degrees and thence passes out of the cavity 69 by way of slot 67 in part 6. It will be noted that the ribbon passes beneath a cap 71 which is secured by cap screws 72 to bracket 73 welded to leg 14, which cap 71 and bracket 73 nonrotatably secure the shaft 61 to the frame 12.

The free end of ribbon 52 extending from the shaft 61 has its leads connected to terminals on a terminal block 76. Electric control apparatus 47 is connected to the terminals of the terminal block 76 by a multiple lead conduit 77. The electrical connections for apparatus 48, 49 are not shown.

Figures 3, 6:
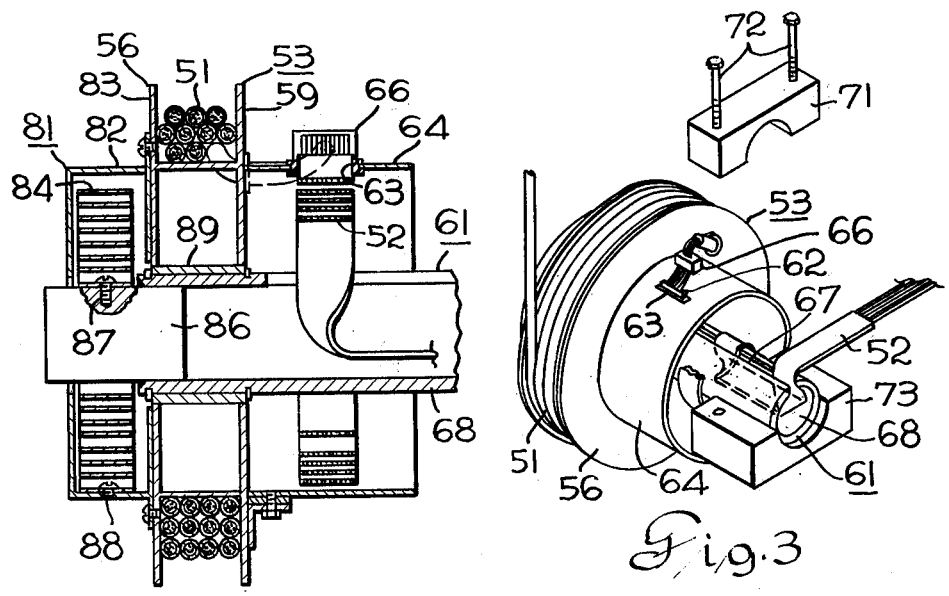
FIG. 3 is a perspective view of the reel of this invention with a shaft mounting cap and cap screws exploded from the mounting bracket.
FIG. 6 is a section view taken along the line VI—VI.

Referring also to FIG. 6, a coil spring mechanism 81, for biasing the primary drum 56 to wind up the conduit 51, includes a drum 82 secured to the annular flange 83 of drum 56 and a coiled spring 84 secured at its inner end to a cylindrical part 86 of shaft 61 by a cap screw 87 and at its outer end to the drum 82 by a cap screw 88. Shaft parts 68 and 86 are coaxial and are welded to one another. The drum 56 includes a cylindrical bearing portion 89 by which the reel mechanism is rotatably journaled on the stationary shaft 61.

OPERATION

Figure 4:
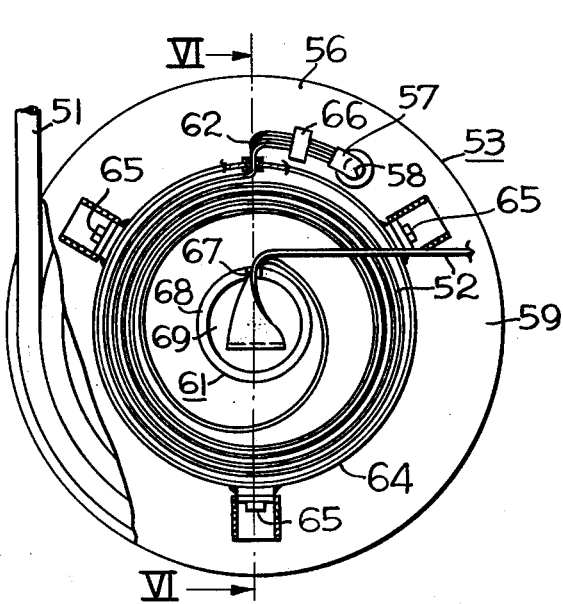
FIG. 4 is a view of the reel with the extensible conduit wound up on its drum.
Figure 5:
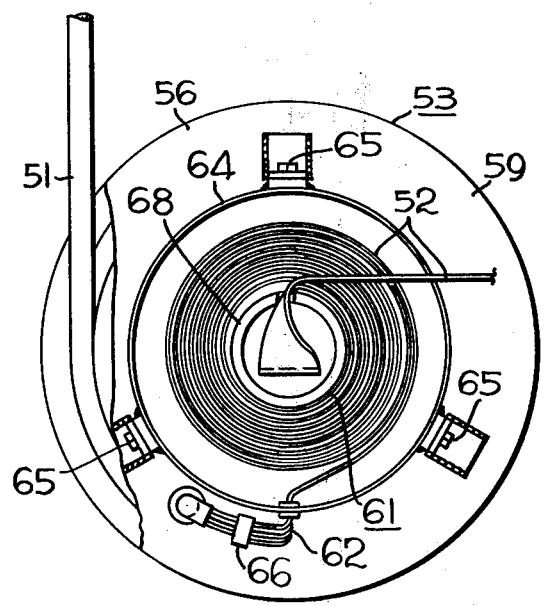
FIG. 5 is a view of the reel with a portion of the extensible conduit reeled out from its drum.

As the operator's station 38 is elevated with the carriage 27, conduit 51 will be reeled out from its drum 56 which will rotate the drums 56, 64 and 82 clockwise as viewed in FIGS. 1, 4 and 5 against the biasing action of the spring mechanism 81. As the round conduit 51 is reeled out, the ribbon 52 is being coiled more tightly about stationary shaft 61. As illustrated in FIG. 5 the ribbon 52 will coil in an orderly manner without excessive stretching and chafing. When the carriage and operator's station are lowered, the spring mechanism 81 will rotate the drums thereby winding up conduit 51 and unwinding the coiled ribbon 52 to its loosely coiled condition shown in FIG. 4.

The reel mechanism of this invention obviates the need for slip ring connections (or other type sliding or relatively rotating electric contacts) for the leads which would be quite bulky and expensive for 30 or more leads as can easily be accommodated by the present invention.

The embodiments of the invention in which an exclusive property or privelege is claimed are defined as follows:

1. An electric conduit reel mechanism without slip rings comprising:
   a stationary shaft adapted for mounting on a support, said shaft having a hollow part with an axially extending slot therein
   a drum assembly rotatably mounted on said shaft and including
   a primary drum and
   a secondary drum
   a flexible multiple lead conduit wound about said primary drum having an outer end adapted for connection to first electric control apparatus,
   a flat flexible multiple lead ribbon coiled within said secondary drum having its outer end connected to the inner end of said conduit and having a radially inner portion passing through a first part of said slot, passing axially along said cavity and then passing out of said cavity through a second part of said slot to an end adapted for connection to second electric control apparatus, and
   spring means connected to said shaft and drum assembly and biasing the latter in a direction of rotation by which said conduit is wound onto said primary drum, said ribbon being coiled from a relatively loose condition to a relatively tight condition when said drum assembly is rotated.

2. The reel mechanism of claim 1 wherein said ribbon is twisted 90° in one direction upon its entrance into said cavity through said first part of said slot and is twisted 90° in the opposite direction just prior to its passing out of said cavity through said second part of said slot, said twisted part of said ribbon serving to mechanically connect the latter to said shaft.

3. The reel mechanism of claim 2 wherein said secondary drum is connected to one axial side of said primary drum and said spring means is disposed on the other axial side of said primary drum.

4. In a lift truck having a main frame, a vertical mast, a carriage and an operator's station which is optionally stationary on the main frame or elevated with the carriage, the combination comprising
   an electric control console mounted on said operator's station,
   electric control apparatus mounted on said main frame,
   an electric conduit reel mechanism without relatively rotating electric contacts comprising:
   a stationary shaft mounted on said main frame,
   a drum assembly rotatably mounted on said shaft and including
   a primary drum and
   a secondary drum
   a flexible multiple lead conduit wound about said primary drum having its leads at its outer end connected to said console,
   a flat flexible multiple lead ribbon coiled within said secondary drum having its leads at its outer end connected to the leads at the inner end of said conduit and having its radially inner portion mechanically connected to said shaft and thence extending to and having its leads connected to said electric control apparatus, and
   spring means connected to said shaft and drum assembly and biasing the latter to wind up said conduit onto said primary drum, the number of turns of said ribbon about said shaft changing as said drum assembly is rotated.

5. The reel mechanism of claim 4 wherein said shaft has a hollow part with an axial slot therein and wherein the radially inner end of said coiled ribbon passes through a first part of said slot, passes axially along said cavity and then passes out of said cavity through a second part of said slot.

6. The reel mechanism of claim 5 wherein said ribbon is twisted 90° in one direction upon its entrance into said cavity through said first part of said slot and is twisted 90° in the opposite direction just prior to its passing out of said cavity through said second part of said slot, said twisted part of said ribbon serving to mechanically connect the latter to said shaft.

7. The reel mechanism of claim 6 wherein said secondary drum is connected to one axial side of said primary drum and said spring means is disposed on the other axial side of said primary drum.

* * * * *